United States Patent [19]

Kuhlberg

[11] Patent Number: 4,785,403
[45] Date of Patent: Nov. 15, 1988

[54] DISTRIBUTED FLIGHT CONDITION DATA VALIDATION SYSTEM AND METHOD

[75] Inventor: Joel F. Kuhlberg, New Hartford, Conn.

[73] Assignee: United Technologies Corporation, Hartford, Conn.

[21] Appl. No.: 858,638

[22] Filed: May 2, 1986

[51] Int. Cl.[4] .................. G06F 15/20; G06F 11/16
[52] U.S. Cl. .................... 364/424.06; 371/68
[58] Field of Search .......... 364/424, 550, 551, 552, 364/431.01, 431.02; 371/25, 26, 67, 68

[56] References Cited

U.S. PATENT DOCUMENTS

| | | | |
|---|---|---|---|
| 3,401,904 | 9/1968 | Nelson | 318/566 |
| 3,811,273 | 5/1974 | Martin | 60/224 |
| 4,032,757 | 6/1977 | Eccles | 371/68 |
| 4,130,241 | 12/1978 | Meredith et al. | 371/68 |
| 4,215,412 | 7/1980 | Bernier et al. | 364/551 |
| 4,296,601 | 10/1981 | Martin | 60/224 |
| 4,504,905 | 3/1985 | Burrage | 364/551 |
| 4,594,849 | 6/1986 | Kenison et al. | 364/431.02 |
| 4,622,667 | 11/1986 | Yount | 371/68 |
| 4,644,538 | 2/1987 | Cooper et al. | 371/68 |
| 4,651,563 | 3/1987 | Zweifel | 364/551 |

FOREIGN PATENT DOCUMENTS 2105492A 3/1983 United Kingdom .

Primary Examiner—Gary Chin
Attorney, Agent, or Firm—Troxell K. Snyder

[57] ABSTRACT

A distributed data acquisition system for a first engine controller determines a final, validated value of a critical flight condition variable by first determining: a first tentative value based on local environmental conditions, a second tentative value based on the performance of a first engine, and a third tentative value transferred directly from a similar data acquisition system linked to a second engine on the same aircraft. The data acquisition system compares the three tentative values and selects a final, validated value for use by the controller.

8 Claims, 1 Drawing Sheet

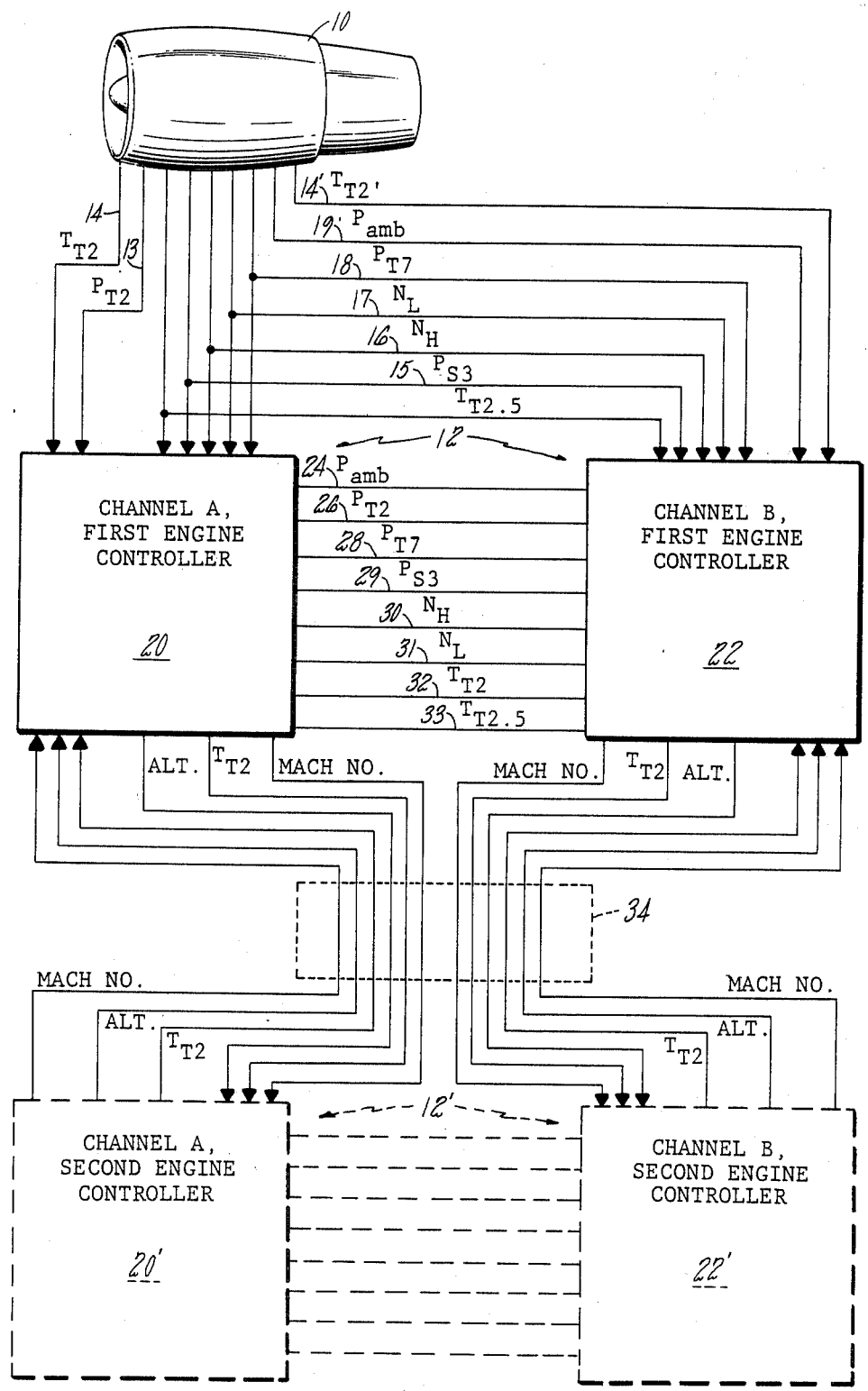

DISTRIBUTED FLIGHT CONDITION DATA VALIDATION SYSTEM AND METHOD

FIELD OF THE INVENTION

The present invention relates to a method and an apparatus for determining validated values of one or more flight condition variables.

BACKGROUND

Modern electronic gas turbine engine control systems, like the older hydraulic engine controllers, rely on a variety of measured and calculated flight condition variables in order to properly achieve the desired engine thrust under a wide variety of aircraft operating conditions. Electronic engine controllers achieve the necessary reliability through the use of redundant sensing and calculating subsystems, substituting multiplicity for the prior art simplicity of former hydromechanical controllers.

Certain flight condition variables are absolutely critical to the functioning of any electronic engine controller. Altitude, inlet air total temperature, and aircraft Mach number form the computational basis upon which the controller determines the current available and delivered engine thrust. An absence or an inaccuracy in any one of these critical variables can result in improper engine thrust delivery and/or reduced engine operating efficiency.

Electronic controllers currently in use develop "validated" values of these critical variables by first calculating tentative values of these critical variables from environmental data measured local to an individual gas turbine engine and comparing this tentative value with one or more other tentative values measured and calculated by the instrumentation associated with the particular aircraft in which the engine is mounted. Such control systems require close correlation and cooperation between the airframe electronic instrumentation system and the individual engine controller.

As may be expected, such close cooperation is somewhat difficult to achieve, especially since commercial gas turbine engines and aircraft are not only produced and designed by different manufacturers, but also due to the applicability of an individual engine product line to one or more aircraft which in turn can accept one or more engine lines. Another difficulty may be appreciated by considering that the connection of the engine controller with the aircraft instrumentation system to validate critical flight condition data also requires that each engine-aircraft combination be separately tested and certified by the appropriate government agencies charged with maintaining the safety of the flying public. Still another factor is the increase in vulnerability which accompanies the increased controller dependency on the aircraft instrumentation.

A further problem arises in attempting to fit newer, electronically controlled engines into older aircraft which were not equipped with the necessary electronic instrumentation to provide values of the critical flight condition variables to the engine controllers. Such retrofits currently require costly upgrading of the otherwise satisfactory aircraft instrumentation system to accommodate the electronic engine controllers. What is needed is a validation system for determining critical flight condition data which is operable independently of the aircraft.

SUMMARY OF THE INVENTION

It is therefore an object of the present invention to provide a data system for determining a validated value of a flight condition variable suitable for controlling a first engine in a multi-engine aircraft.

It is further an object of the present invention to determine a first tentative value of the flight condition variable from local environmental measurements.

It is further an object of the present invention to synthesize a second tentative value of the flight condition variable from measurements of the first engine performance parameters.

It is further an object of the present invention to obtain a third value of the flight condition variable directly from a second data system associated with a second engine on the aircraft.

It is still further an object of the present invention to compare the first, second, and third tentative values of the flight condition variable, and, based at least in part upon the comparison, select a validated value of the flight condition variable for use in controlling the first engine.

According to the present invention, an engine fuel controller for a first engine on a multi-engine aircraft is provided with a means for determining a validated value of a flight condition variable which operates independently of the airframe control and instrumentation system. The validation means determines two tentative values of the flight condition variable locally from environmental measurements and from engine performance parameters, respectively. A third value is obtained via a cross-engine data link from a substantially identical controller associated with a second engine on the same aircraft.

The validation means chooses among the three tentative values to select a final, validated value for the flight condition variable, with the final value being used by the first engine controller as a basis for accurately regulating engine fuel flow and other engine components in response to demanded engine thrust. The validated value may additionally be passed to the second engine controller via the cross-engine data link and there used in a like fashion for validating flight condition data by the second controller.

More specifically, the critical flight condition variables validated by the means and method according to the present invention include aircraft altitude, Mach number, and engine air inlet total temperature. The environmental measurements include engine air inlet total pressure, engine air inlet total temperature, and ambient air pressure. The monitored engine performance parameters used to synthesize the second tentative flight condition variable value include engine rotor speed (high, low, or both), burner pressure, compressor outlet air total temperature, and overall engine pressure ratio.

The controller and validation means according to the present invention thus provide a redundant, distributed data validation system which passes data directly between similar engines independent of the aircraft instrumentation systems. This independence facilitates the installation of a particular production engine line into a variety of different aircraft, avoiding the occurrence of any electronic mismatch between the engine and aircraft electronics as well as avoiding any need to recertify the operation of the engine controller data acquisition system in each different aircraft.

The final result is a simple, reliable system which is able to closely and continuously monitor and control engine operation in a multi-engine aircraft application.

BRIEF DESCRIPTION OF THE DRAWING

The FIGURE shows an information flow schematic of an engine controller with a data acquisition system according to the present invention.

DETAILED DESCRIPTION OF THE PREFERRED EMBODIMENT

Referring to the drawing FIGURE, the preferred embodiment of a data acquisition/validation/controller system according to the present invention will be described. The schematic shows a first gas turbine engine 10 mounted (not shown) on a multiple engine aircraft (also not shown). The first engine 10 is connected to a first engine fuel controller 12 by a plurality of data transmision links 13-19, 21 for conveying locally acquired environmental and engine operating data. For an electronic controller 12 such as that shown in FIG. 1, these data transmission links 13-19, 21 are electrical conductors carrying an electrical signal responsive to the conditions measured be sensors, transducers, etc.

As shown in the FIGURE, the engine controller 12 includes a pair of nearly identical, redundant data acquisition and control systems 20, 22 identified respectively as channel A and channel B. The twin systems 20, 22 in the preferred embodiment are each fully capable of monitoring the acquired data from the engine-controller data links 13-19, 21 and are each capable of controlling the operation of the engine 10 by supplying a fuel regulation signal (not shown) to a fuel regulating means (not shown) such as a fuel metering valve.

Each channel, 20, 22 receives environmental data measured local to the first engine 10, sharing some values and not others. Specifically, in the preferred embodiment channel A 20 receives engine air inlet total pressure 13 ($P_{T2}$) and engine air inlet total temperature 14 ($T_{T2}$) directly from the engine while channel B 22 directly receives engine air inlet total temperature 14' ($T_{T2}'$), and ambient air pressure 19 ($P_{amb}$).

The twin channels 20, 22 also receive engine performance parametric data, which in the preferred embodiment includes engine burner absolute static pressure ($P_{S3}$) via data link 15, high speed rotor speed ($N_H$) via data link 16, low speed rotor speed ($N_L$) via data link 17, turbine outlet total pressure ($P_{T7}$) via data link 18, and low compressor outlet air total temperature ($T_{T2.5}$) via data link 21. Each channel, in turn, passes its received data to its twin channel via a series of interchannel links 24-33. Measurement values received by only one channel, such as $P_{amb}$ and $P_{T2}$ are passed unidirectionally between the channels 20, 22 as with the data connections numbered 24 and 26. Data received by both channels from the engine 10, such as $P_{T7}$, $P_{S3}$, $N_H$, $N_L$, $T_{T2}$, and $T_{T2.5}$ are transferred between the channels 20, 22 over two-way data connections numbered 28-33a.

It should be noted at this and all further points that although FIG. 1 shows channels A and B 20, 22 for the most part receiving data split from individual data links, for example the $P_{T7}$ link 18, it will be appreciated that certain applications and measurements may equivalently be taken and transmitted by parallel sensor and data link configurations such as $T_{T2}$ 14 and $T_{T2}'$ 14'. Thus, the simplicity of the information flow schematic shown in the FIGURE is inclusive of the physical embodiment of the present invention in which two independent sensor probes and data links convey an environmental or performance related signal from the first engine 10 to the respective channels 20, 22.

The function of the first engine controller 12 may now be discussed in some detail. Each channel receives measured environmental data in the form of engine air inlet total pressure, engine air inlet total temperature, and ambient air pressure from either the engine-controller data links 13, 14 or 14' from the appropriate interchannel data connections 24, 26. This environmental data forms a sufficient basis to determine a first tentative value for engine inlet air total temperature, engine inlet airflow Mach number, and/or the current altitude of the aircraft.

Each of the twin channels 20, 22 of the first engine controller 12 also simultaneously synthesizes second tentative values for one or more of these three critical flight condition variables from the engine operating parameters, $P_{S3}$, $N_H$, $N_L$, $P_{T7}$, and $T_{T2.5}$. This synthesis is accomplished by methods and means well known in the turbine engine control art, utilizing measured operating data from similar engines under controlled conditions to back-calculate the current first engine flight conditions from the current engine performance.

It should be noted that individual measured engine performance parameters may be combined with environmental measurements to produce useful engine performance data, for example, the ratio of $P_{T7}$ to $P_{T2}$, or overall engine pressure ratio, is an important engine operating parameter useful in setting engine thrust under a given set of flight conditions.

Each channel compares the first tentative values of $T_{T2}$, Mach number, and altitude with the second, synthesized, tentative values of each of these variables, and additionally receives a third set of values for comparison via a cross engine data link 34 connecting respective channels A and B 20, 22 with substantially identical counterpart channels 20', 22' of a second engine controller 12' on the same aircraft. The cross-engine data bus 34 transfers values of the critical flight condition variables directly between the matching controllers 12, 12' thus giving each channel of each controller a "third vote" in determining a final, validated value of each critical variable.

The logic of choosing among the first, second, and third tentative values produced or supplied to each channel 20, 22 may vary according to the needs of each particular engine and controller combination, and will therefore not be discussed in detail. It is sufficient to note that each channel may use any one of a wide variety of known selection logic, including, but not limited to: establishing a level of confidence in each value by continuity and range checking of the associated sensor and data link; comparing each value with the others and a predetermined tolerance margin; and selecting an individual value based on the confidence level, desired engine performance, and/or weighted average of the individual values. Each channel may not only compare the magnitude of the three tentative values of each critical flight condition variable, but may also make individual quality determinations with regard to the individual tentative values.

The twin channels 20, 22 have the ability and mandate to pass control of the first engine 10 from one to the other depending on the functionality of each channel determined either internally or externally. For example, if channel A 20 should note a failure within itself it will pass responsibility to channel B 22. The final result is either the selection of a set of critical, validated values for use by the controller in automatically regulating fuel flow in response to the level of thrust requested by the pilot of the airplane, or a failure signal to the pilot or flight engineer advising that the engine controller has determined that a possible malfunction has occurred sufficient to result in the relinquishment of automatic control to an alternate, simpler control mode.

The benefits of the control system according to the present invention should now be apparent. Each engine controller 12, 12' in a multiple engine configuration is able to determine validated values of critical flight condition variables such as $T_{T2}$, Mach number and altitude independently of the aircraft instrumentation and control system. Each of the tentative values considered by the individual channels 20, 22 is obtained from independent bases, the first tentative value determined from environmental measurements local to the engine 10, the second tentative value synthesized from the measured performance of the engine 10, and the third value obtained from a substantially identical control system coupled to a substantially identical engine on the same aircraft.

Preferably, the third value passed between the channels of similar controllers 12, 12' will be the final, validated value selected by the respective transmitting channel. A failure or possible error occurring in one channel causes an immediate shift of control to the local twin channel which, if otherwise unimpaired, controls the engine. Such multiple redundancy minimizes the chance of miscontrolling an individual engine due to failure or malfunction of an individual sensor or possible human error resulting from an inability to monitor and correlate the variety of information available on the aircraft flight deck.

For example, a blocked pressure tap at the engine inlet may result in a false reading of engine pressure ratio which might be interpreted by the aircraft flight engineer using prior art controllers as an accurate indication of current engine thrust. The data acquisition and control system according to the present invention additionally continuously monitors both high and low rotor speeds (on a twin spool engine), and burner pressure, each of which behaves in a known fashion with respect to engine pressure ratio (calculated from $P_{T2}$ and $P_{T7}$). The blocked pressure tap at the engine inlet results in a mismatch of the critical flight condition variables tentatively determined and synthesized within the individual channels 20, 22 as well as a mismatch with the third tentative value received from a second engine on the same aircraft. Such an unresolved mismatch, in particular between the tentative values calculated and synthesized based on the local engine data is sufficient cause for the controller 12 to alert the maintenance system as to a potential engine control problem.

The cross engine data link 34 is a simple data bus, directly transferring electrical signals indicative of the validated values of the critical flight condition variables finally selected by each channel 20, 22, 20', 22' of the linked engine controllers 12, 12'. Such link systems 34 include necessary safety fusing, lightning protection, etc. according to techniques and apparatus well known in the art to insure that a disturbance in one or the other controller 12, 12' or in the data bus 34 itself will not simultaneously induce failure of an otherwise properly functioning controller.

The present invention thus provides both a means and method for distributively acquiring and generating critical flight condition data for a multi-engine aircraft or the like. The preferred embodiment discussed hereinabove is well adapted for achieving those objects and advantages set forth in the preceding section of this specification, but it will be appreciated by those skilled in the art of gas turbine engine control that other features and advantages may be obtained utilizing similar control and data acquisition system configurations that do not depart from the scope of the present invention.

What is claimed is:

1. A flight condition data validation system for an aircraft having at least a first engine and a second engine, comprising:
    a first engine controller including
        means for generating an electrical signal commensurate with the first engine air inlet total pressure,
        means for generating an electrical signal commensurate with the first engine air inlet total temperature,
        means for generating an electrical signal commensurate with the ambient air pressure local to the first engine,
        means for generating an electrical signal commensurate with the engine turbine exhaust total pressure,
        means for generating an electrical signal commensurate with the rotor speed of the first engine,
        means for generating an electrical signal commensurate with the first engine burner absolute pressure,
        means for generating an electrical signal commensurate with the first engine low compressor outlet air total temperataure,
        means, responsive to the first engine air inlet total pressure signal, first engine air inlet total temperature signal, and the local ambient air pressure signal, for deriving a first tentative value of a critical flight condition variable selected from the group of aircraft altitude, Mach number, or total air temperature,
        means, responsive to the first engine burner absolute pressure signal, first engine rotor speed signal, first engine turbine exhaust total pressure signal, and first engine compressor outlet air total temperature, for synthesizing a second tentative value of the critical flight condition variable;
    a data bus directly connecting the first engine controller to a substantially similar second engine controller for passing a third tentative value of the critical flight condition variable determined by the second engine controller to the first engine controller; and
    means for determining a final, validated value of the critical flight condition variable for use in regulating a flow of fuel to the first engine, including
        means for comparing the magnitude and quality of the first tentative value, the second tentative value, and the third tentative value of the critical flight condition variable, and
        means, responsive to the comparing means, for logically selecting the final, validated value from one of the first, second, and third tentative values.

2. A system for providing a validated value of a critical flight condition variable to a first engine controller in an aircraft having a first engine and a second engine, comprising:
- means, local to the first engine, for measuring a plurality of physical environmental conditions;
- means for measuring a plurality of first engine performance parameters;
- means for deriving a tentative first value of the critical flight condition variable from the plurality of measured environmental conditions;
- means for synthesizing a tentative second value of the critical flight condition variable from the plurality of measured engine performance parameters;
- means, linked with the second engine, for determining a third tentative value of the critical flight condition variable from measured environmental conditions and performance parameters corresponding to the second engine;
- means for conveying the third tentative value from the second engine controller directly to the first engine controller; and
- means, responsive to the first, second and third tentative values, for determining a final, validated value of the critical flight condition variable.

3. The system for providing a validated value of a critical flight condition variable as recited in claim 1, wherein
the critical flight condition variable is selected from the group of variables consisting of aircraft altitude, Mach number and first engine air inlet total temperature.

4. The system for providing a validated value of a critical flight condition variable as recited in claim 2, wherein
the plurality of environmental conditions measured local to the first engine includes one or more variables selected from the group of variables consisting of first engine air inlet total temperature, first engine air inlet total pressure, and ambient air pressure.

5. The system for providing a validated value of a critical flight condition variable as recited in claim 2, wherein
the plurality of first engine performance parameters includes one or more parameters selected from the group of parameters consisting of first engine turbine exhaust total pressure, first engine rotor speed, first engine burner absolute pressure, and first engine low compressor outlet air total temperature.

6. A method for providing a validated value of a critical flight condition variable to a first engine controller for controlling a first engine of an aircraft having two or more engines, comprising the steps of:
- measuring a first plurality of environmental conditions local to the first engine;
- calculating a first tentative value of the critical flight condition variable responsive to the first plurality of environmental conditions;
- measuring a plurality of first engine performance parameters;
- calculating a second tentative value of the critical flight condition variable responsive to the plurality of first engine performance parameters;
- determining a third tentative value of the critical flight condition variable by a data acquisition system, responsive to both a second plurality of environmental conditions local to a second engine and to a plurality of second engine performance parameters; and
- comparing the magnitude and quality of the first, second, and third tentative values of the critical flight condition variable and, based upon said comparing step, logically selecting from among said tentative values for determining a validated flight condition variable value for use by the first engine fuel controller.

7. The method as recited in claim 6, wherein the step of measuring the first plurality of physical environmental conditions at the inlet of the first engine comprises the steps of:
- measuring the ambient air pressure;
- measuring the total pressure of the air entering the first engine inlet; and
- measuring the total temperature of the air entering the first engine inlet.

8. The method as recited in claim 6, wherein the step of measuring the plurality of first engine performance parameters includes the steps of:
- measuring the first engine turbine exhaust total pressure;
- measuring the speed of at least one rotor of the first engine;
- measuring the absolute pressure in the burner section of the first engine; and
- measuring the air total temperature at the outlet of the low compressor section of the first engine.

* * * * *